(12) United States Patent
Illingworth et al.

(10) Patent No.: US 12,449,880 B2
(45) Date of Patent: Oct. 21, 2025

(54) SPACE EFFICIENT RAIL DESIGN FOR REAR INPUT/OUTPUT MODULES

(71) Applicant: DELL PRODUCTS L.P., Round Rock, TX (US)

(72) Inventors: Patrick Illingworth, Austin, TX (US); Eduardo Escamilla, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 375 days.

(21) Appl. No.: 18/168,661

(22) Filed: Feb. 14, 2023

(65) Prior Publication Data

US 2024/0272694 A1    Aug. 15, 2024

(51) Int. Cl.
| | |
|---|---|
| *G06F 1/3206* | (2019.01) |
| *G06F 1/16* | (2006.01) |
| *G06F 1/18* | (2006.01) |
| *H05K 7/14* | (2006.01) |
| *H05K 7/18* | (2006.01) |

(52) U.S. Cl.
CPC .......... *G06F 1/3206* (2013.01); *G06F 1/1601* (2013.01); *H05K 7/1407* (2013.01); *G06F 1/184* (2013.01); *H05K 7/183* (2013.01)

(58) Field of Classification Search
CPC ...................................................... G06F 1/181
See application file for complete search history.

(56) References Cited

U.S. PATENT DOCUMENTS

| | | | |
|---|---|---|---|
| 6,088,222 A | 7/2000 | Schmitt et al. | |
| 6,600,648 B2 | 7/2003 | Curlee et al. | |
| 2021/0011529 A1* | 1/2021 | Escamilla | ................ G06F 1/186 |
| 2021/0325851 A1* | 10/2021 | Lambert | .................... G06F 8/65 |

\* cited by examiner

*Primary Examiner* — Jerry Wu
(74) *Attorney, Agent, or Firm* — Larson Newman, LLP

(57) ABSTRACT

A mounting rail for an input/output module of an information handling system is disclosed. The mounting rail includes a main portion, first and second railings, a non-threaded channel, and a threaded engagement. The main portion includes first, second, third, and fourth surfaces. The first and second surfaces intersect at a first edge of the first surface. The first railing extends from the first edge of the first surface. The second railing extends from a second edge of the first surface. The non-threaded channel extends from the second surface through the main portion to the third surface. The threaded engagement is secured to the second surface of the main portion, and is aligned with the non-threaded channel. The threaded engagement is located along a third edge at the intersection between the second surface and the fourth surface, and the third edge is distal from the first edge.

17 Claims, 6 Drawing Sheets

SPACE EFFICIENT RAIL DESIGN FOR REAR INPUT/OUTPUT MODULES

FIELD OF THE DISCLOSURE

The present disclosure generally relates to information handling systems, and more particularly relates to a space efficient rail design for rear input/output modules.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A mounting rail for an input/output module of an information handling system is disclosed. The mounting rail includes a main portion, first and second railings, a non-threaded channel, and a threaded engagement. The main portion includes first, second, third, and fourth surfaces. The first and second surfaces intersect at a first edge of the first surface. The first railing extends from the first edge of the first surface. The first and third surfaces intersect at a second edge of the first surface. The second railing extends from the second edge of the first surface. The non-threaded channel extends from the second surface through the main portion to the third surface. The threaded engagement is secured to the second surface of the main portion and is aligned with the non-threaded channel. The threaded engagement is located along a third edge at the intersection between the second surface and the fourth surface, and the third edge is distal from the first edge.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
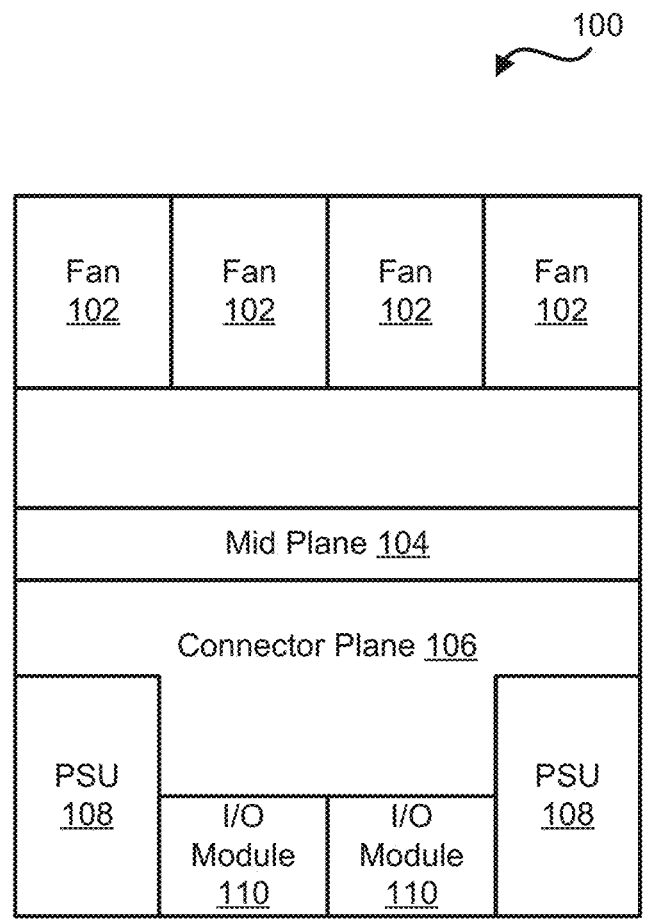
FIG. 1 is a diagram of a portion of an information handling system according to at least one embodiment of the present disclosure.

FIG. 1 illustrates a portion of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes multiple cooling fans 102, a midplane 104, a connector plane 106, multiple power supply units 108, and multiple input/output (I/O) modules 110. Information handling system 100 may be any suitable device including, but not limited to a server. In an example, cooling fans 102 may be located in a front portion of information handling system 100, and power supply units 108 and I/O modules 110 VM 104 may be located in a rear portion of the information handling system. Connector plane 106 may communicate with power supply units 108 and I/O modules 110. Connector plane 106 may be in communication with midplane 104, such that the connector plane may provide power from power supply units 108 to other components of information handling system 100 via the midplane. Connector plane 106 and midplane 104 may also provide communication between I/O modules 110 and other components of the information handling system. In an example, power supplies 108 may be any suitable type of power supply including, but not limited to, a common redundant power supply (CRPS). I/O module 110 may be any suitable type of I/O module including, but not limited to, a datacenter-ready secure control module (DC-SCM). Information handling system 100 may include additional components without varying from the scope of this disclosure.

In certain examples, connector plane 106 may be securely mounted within information handling system 100. In an example, within connector plane 106, connectors for power supplies 108 may be near the connectors for I/O modules 110. I/O modules 110 may be in a physical interface with a mounting rail to align the I/O module with a connector on connector plane 106. In previous information handling systems, based on the proximity of the connectors for the power supplies and the I/O modules on connector plane 106, the mounting rail for an I/O module would interfere with the mounting of the power supply units. Information handling system 100 may be improved via a mounting rail that may provide alignment for I/O module 110 without causing physical interference with the mounting of power supply 108.

Figure 2:
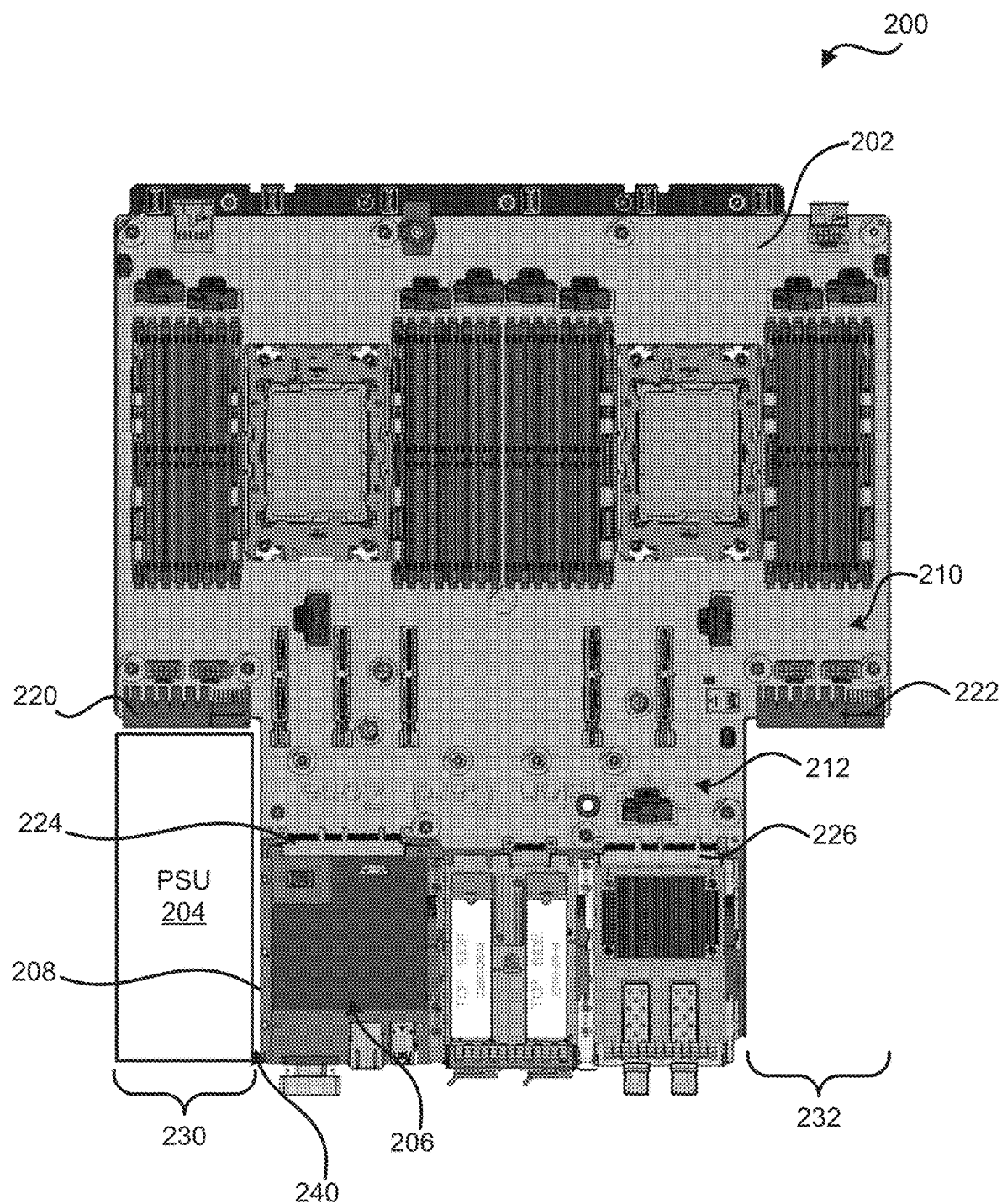
FIG. 2 is a diagram of a connector plane, a power supply unit, and an input/output module of an information handling system according to at least one embodiment of the present disclosure.

FIG. 2 illustrates a portion of an information handling system 200 including a connector plane 202, a power supply unit 204, an input/output module 206, and a mounting rail 208 according to at least one embodiment of the present disclosure. Connector plane 202 includes a main portion 210 and an extension portion 212. Main portion 210 includes power supply connectors 220 and 222, and extension portion 212 includes I/O module connectors 224 and 226. In an example, while only a single power supply unit 204 is shown, different power supply units may connect and communicate with each of connectors 220 and 222. Extension portion 212 is located between connectors 220 and 222 and extends from main portion 210. In certain examples, extension portion 212 may extend from main portion 210 at a length that is substantially equal to a length of power supply unit 204.

In an example, a layout of control plane 202 may be according to any particular configuration standard, such as a full width high performance module (HPM) (M-FLW) standard. According to the M-FLW standard, the locations of connectors 220, 222, 224, and 226 within control plane 202 are set, such that any information handling system adhering to this standard must have these connectors in locations identified by the specification for the standard. In an example, the M-FLW standard has connectors 220 and 224 close to each other. In certain examples, the connection between I/O module 206 and connector plane 202 may be via a tempan integration or without a tempan integration. In an example, the tempan integration allows for coupling I/O module 206 to connector plane 202 a tempan, such as tempan 310 of FIG. 3, and without tempan integration assumes that the tempan is unnecessary in the I/O module. In an example, the tempan integration may result in a possibility of mounting rail 314 interfering with the insertion of power supply unit 204 within connector plane 202 of an information handling system. In this example, an information handling system may be improved by mounting rail 314 being narrower than previous mounting rails as will be described herein.

In certain examples, the different dimensions of main portion 210 and extension portion 212 may create locations for power supply units 204 to be inserted within the information handling system and plug into connectors 220 and 222 of connector plane 202. In an example, a width 230 of power supply unit 204 may be almost equal to a width 332 of main portion 210. Width 332 may be a distance from an edge of extension portion 212 to an edge of main portion 210. In certain examples, a length of power supply unit 204 may be substantially equal to a distance that extension portion 212 extends from main portion 210.

In an example, mounting rail 208 may be securely connected to extension portion 212 of connector plane 202. In certain examples, mounting rail 208 may provide a channel for an edge of I/O module 206 to slide within. As the edge of I/O module 206 slides within the channel of mounting rail 208, the I/O module may be properly aligned with connect 224. In an example, the physical dimensions of mounting rail 208 may enable I/O module 206 to plug into connector 224 while not interfering with the insertion of power supply unit 204 within the information handling system. In certain examples, a gap 240 may exist between power supply 204 and mounting rail 208.

Figure 3:
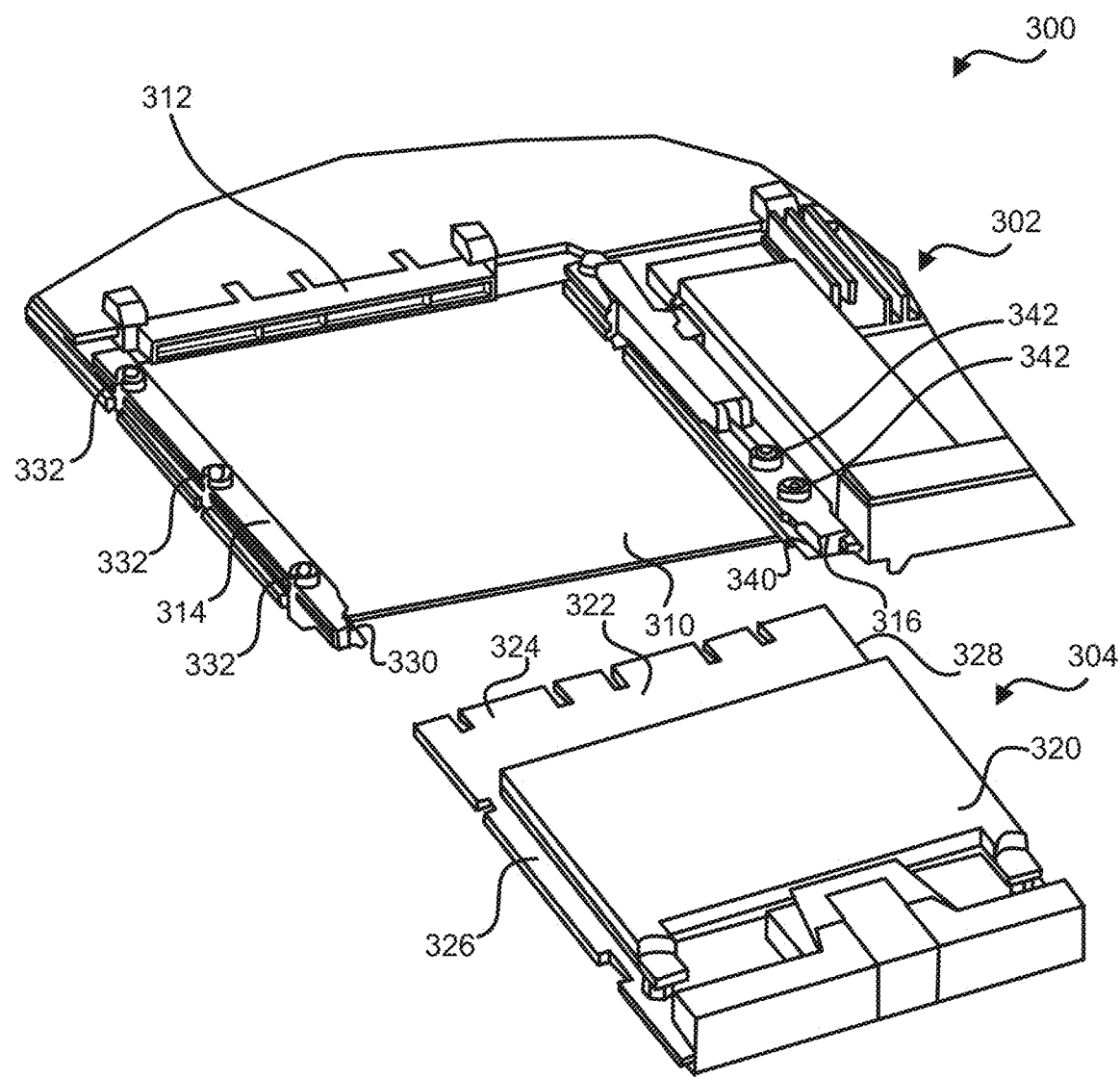
FIG. 3 is a diagram of a portion of a connector plane and an input/output module of an information handling system according to at least one embodiment of the present disclosure.

FIG. 3 illustrates a portion of a connector plane 302 and an I/O module 304 of an information handling system, such as information handling system 100 of FIG. 1 according to at least one embodiment of the present disclosure. Connector plane 302 may be substantially similar to connector plane 202 of FIG. 2. I/O module 304 may be substantially similar to I/O module 206 of FIG. 2. Connector plane 302 includes a tempan 310, a connector 312, and mounting rails 314 and 316. I/O module 304 includes an I/O component 320, a printed circuit board 322, and edges 324, 326, and 328 of the printed circuit board. Mounting rail 314 includes a channel 330 and multiple threaded inserts 332. Mounting rail 316 includes a channel 340 and multiple threaded engagement holes 342. When I/O module 304 is inserted within the information handling system, edge 326 may slide through channel 330 and edge 328 may slide through channel 340 to provide proper alignment of edge 324 with connector 312. Based on the I/O module 304 being inserted within the information handling system, I/O component 320 may communicate with other components of information handling system via edge 324 and connector 312.

In an example, mounting rails 314 and 316 may be securely connected to tempan 310 to hold the mounting rails in properly alignment with respect to connector 312 of connector plane 302. For example, different fasteners may be placed through each of threaded inserts 332 to securely hold mounting rail 314 in physical communication with tempan 310. Similarly, different fasteners may be placed through each of threaded engagement holes 342 to securely hold mounting rail 316 in physical communication with tempan 310. In certain examples, mounting rails 314 and 316 may be connected to a chassis of the information handling system.

In certain examples, the location of threaded inserts 332 along mounting rail 314 may differ from the location of threaded engagement holes 342 along mounting rail 316. For example, threaded inserts 332 may be positioned or located along a first edge of a top surface of mounting rail 314. Threaded engagement holes 342 may be positioned or located substantially in the center of a top surface of mounting rail 316. Based on the locations of threaded inserts 332 and threaded engagement holes 342 along the respective mounting rails 314 and 316, the overall widths of the mounting rails may be different. For example, channels 330 and 340 may be cut the same distance into respective mounting rails 314 and 316.

In an example, threaded inserts 332 may be a small portion above the top surface of mounting rail 314 and each threaded insert may have a different non-threaded hole that extends from a bottom edge of the respective threaded insert through a bottom surface of the mounting rail. Threaded engagement holes 342 may be threaded an entire distance from the top surface of mounting rail 316 through a bottom surface of the mounting rail. Based on threaded engagement holes 342 being threaded the entire way through mounting rail 316, a main portion of mounting rail 316 may be wider than a main portion of mounting rail 314.

Figure 4:
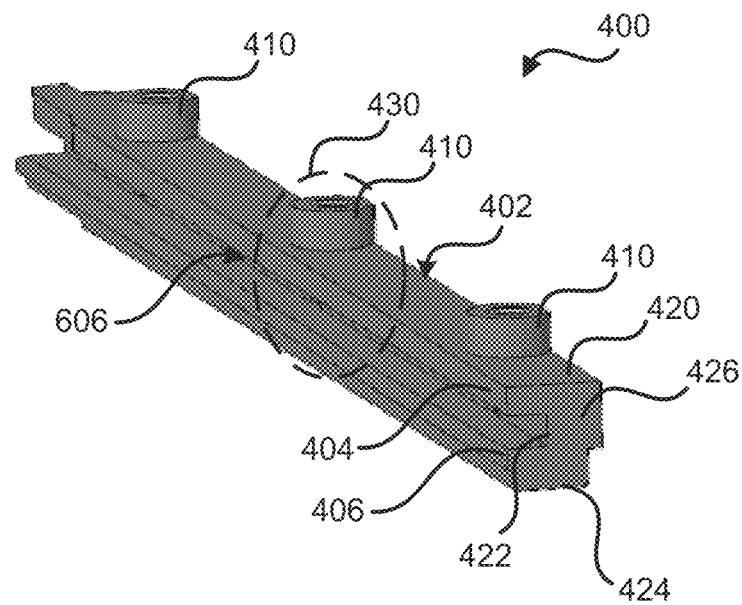
FIG. 4 is a diagram of an input/output module in physical communication with a mounting rail of a connector plane according to at least one embodiment of the present disclosure.

FIG. 4 illustrates a mounting rail 400 according to at least one embodiment of the present disclosure. Mounting rail 400 may be substantially similar to mounting rail 208 of FIG. 2 and mounting rail 314 of FIG. 3. Mounting rail 400 includes a main portion 402 and railings 404 and 406. A channel 408 is formed by railings 404 and 406 and main portion 402. Mounting rail 402 further includes multiple thread engagements 410. Main portion 402 includes surfaces 420, 422, 424, and 426. Railings 404 and 406 may extend from surface 422 of main portion 402, and channel 408 may be located or formed between the railings and surface 422.

In an example, thread engagements 410 may be located on surface 420. In certain examples, thread engagements 410 may be located along a first edge of surface 420, such as along the edge created by the insertion of surface 420 and surface 426. Based on the location of thread engagements 410 mounting rail 400 may be securely attached to an information handling system by multiple screws without the screws affecting a depth of channel 408.

Figure 5:
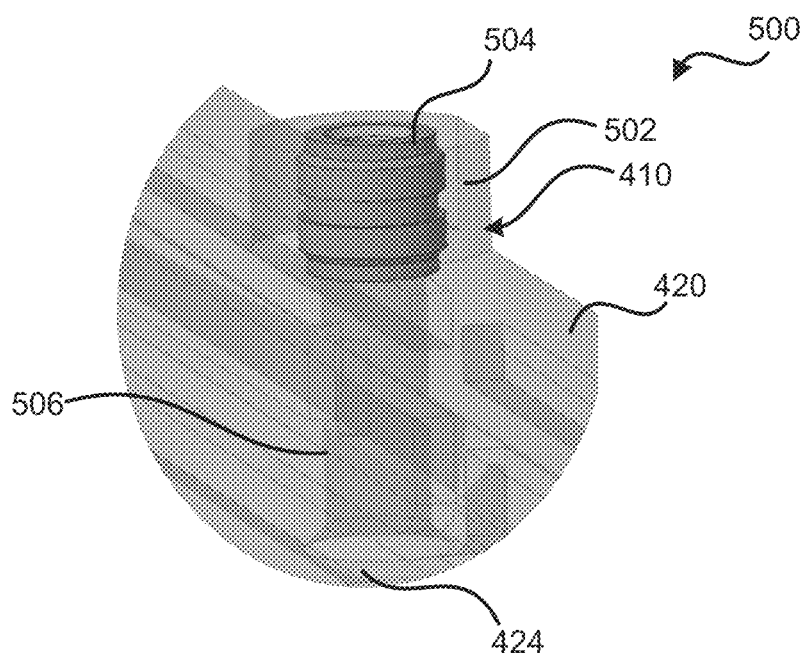
FIG. 5 is a diagram of a mounting rail according to at least one embodiment of the present disclosure.

FIG. 5 illustrates a portion 500 of mounting rail 400 as indicated by dash circle 430 according to at least one embodiment of the present disclosure. Thread engagement 410 includes an outer edge 502, a threaded insert 504, and a non-threaded channel 506. In an example, outer edge 502 and threaded insert 504 may be located on top of surface 420, and non-threaded channel 506 may extend from the top of surface 420 through main portion 402 and surface 424.

In an example, outer edge 502 may extended from and may be securely attached to surface 420 via any suitable manner, such as being formed during a same operation as main portion 402. In certain examples, threaded insert 504 may include a thickened wall, which in turn may include threads to interface with a screw. In an example, non-threaded channel 506 may not have the thickened wall as found in threaded insert 504. Instead, a diameter of non-threaded channel 506 may be larger than a diameter of a screw, such that the screw may slide through the non-threaded channel without interfacing within the wall of the non-threaded channel. In an example, the wall of non-threaded channel 506 does not need to be thickened because the lack of threads. Therefore, both of surfaces 422 and 426 may be placed near the wall of non-threaded channel 506.

In certain examples, the combination of threaded insert 504 being in physical communication with surface 420 and the extension of non-threaded channel 506 from surface 420 to surface 424 of main portion 402 causes mounting rail 400 to be more narrow than previous mounting rails. For example, thread engagement 410 may cause any suitable amount of width reduction, such as three millimeters, four millimeters, five millimeters, or the like. While threaded insert 504 is described herein as including threads, the threaded inserted may have a thickened wall for use with a plastic screw. As stated above, the narrower width of mounting rail 400 may allow a power supply, such as power supply 204 of FIG. 2, to fit within a tempan design integration coupling of a connector plane and an I/O module, such as connector plane 202 and I/O module 206 of FIG. 2.

Figure 6:
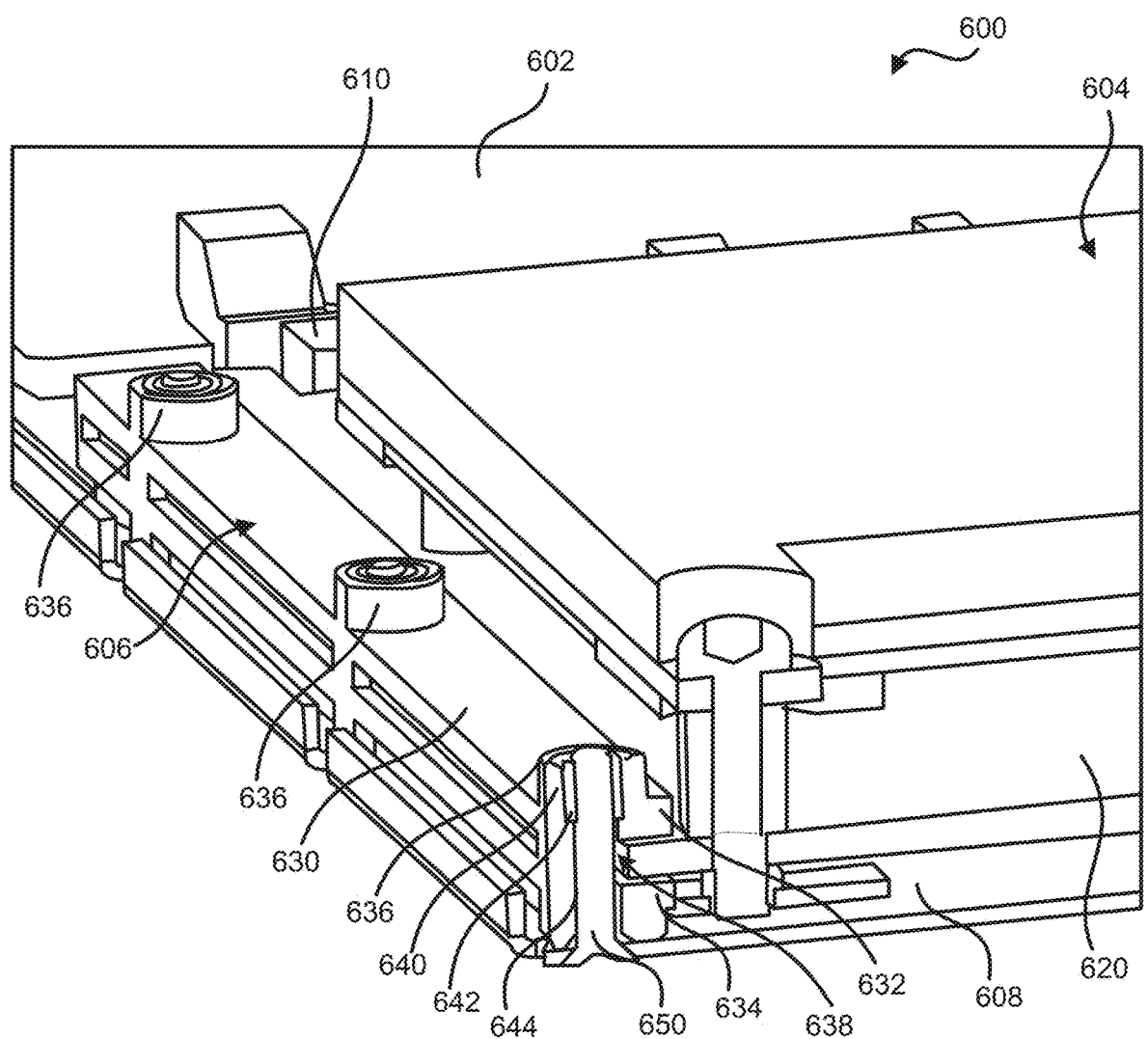
FIG. 6 is a diagram of a portion of the mounting rail according to at least one embodiment of the present disclosure.

FIG. 6 illustrates a portion of an information handling system 600 according to at least one embodiment of the present disclosure. Information handling system 600 includes connector plane 602, an I/O module 604, a mounting rail 606, and a tempan 608. Connector plane 602 may be substantially similar to connector plane 302 of FIG. 3, I/O module 304 of FIG. 3, and tempan 310 of FIG. 3. Connector plane 602 includes a connector 610. I/O module 604 includes a printed circuit board (PCB) 620. Mounting rail 606 includes a main portion 630, railings 632 and 634, and thread engagements 636. A channel 638 is formed from railings 632 and 634 and main portion 630. In an example, thread engagements 636 may be mounted on a top surface of main portion 630. FIG. 6 further illustrates a cross section of I/O module 604 and one of thread engagements 636.

Thread engagement 636 includes an outer edge 640, a threaded insert 642, and a non-threaded channel 644. In an example, a screw 650 may securely attach mounting rail 606 to tempan 608. Screw 650 may slide through non-threaded channel 644 and the threads of the screw may interface with threaded insert 642 to hold mounting rail 606 in physical communication with tempan 608. Thread engagements 636 are located along an edge of main portion that is opposite channel 638. Outer edge 640 may be substantially circular or donut in shape and have a thickness from a surface of the outer edge to an outer surface of threaded insert 642. In certain examples, a portion of outer edge 640, such as the thickness of the outer edge, may be located above railing 632 to enable a width on mounting rail 606 to be narrower than previous mounting rails.

In an example, threaded insert 642 may have a thickened wall that includes threads to interface with the threads of screw 650. In certain examples, a width of main portion 630 may be equal to the thickness of outer edge 640 and a diameter of non-threaded channel 644. As shown in FIG. 6, non-threaded channel 644 may be located substantially close to an edge of channel 638. As stated above, non-threaded channel 644 does not include a thickened wall, which may result in main portion 630 being narrow enough to allow a power supply, such as power supply 204 of FIG. 2, to slide past mounting rail 606 and interface with connector plane 602.

Figure 7:
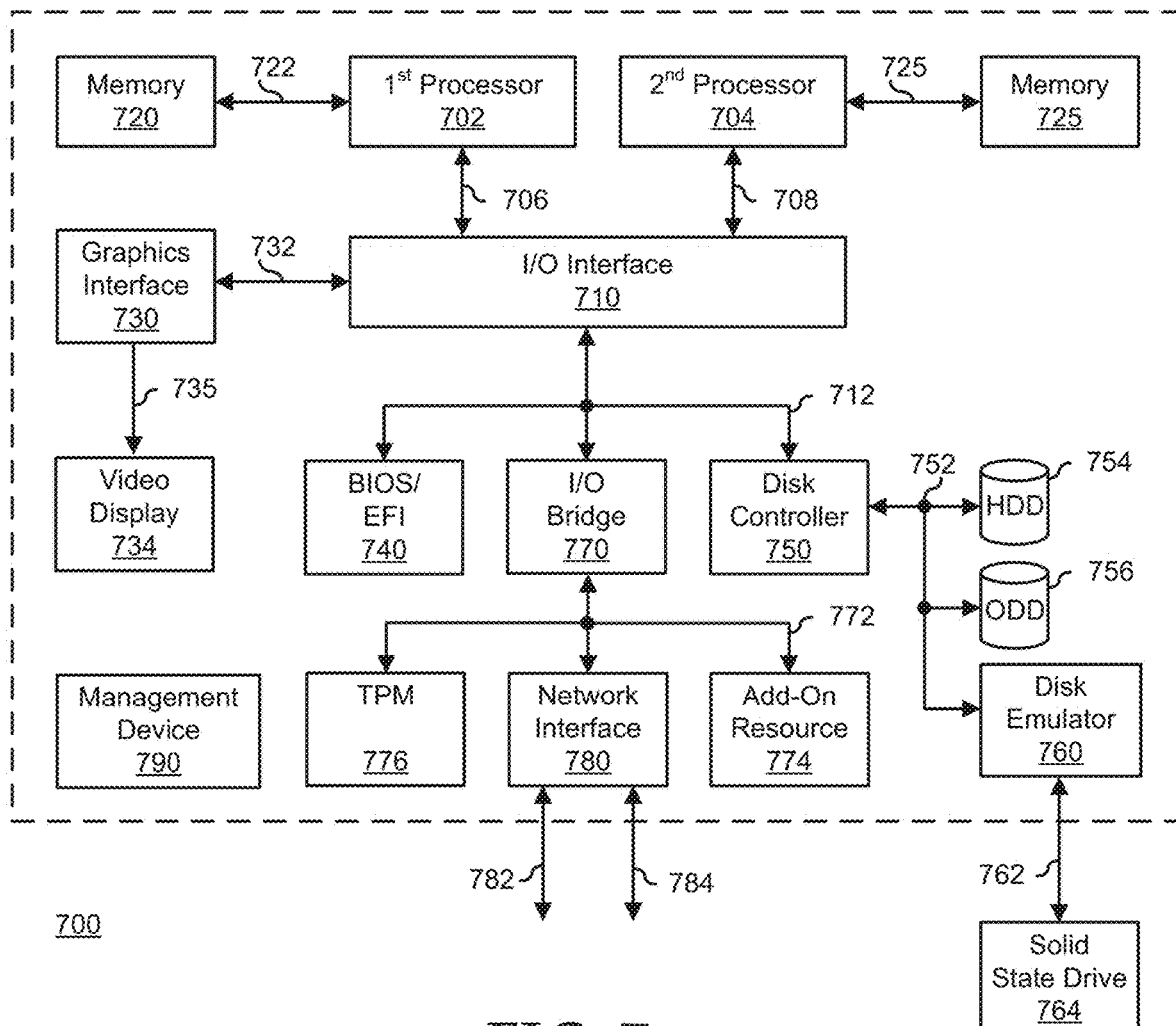
FIG. 7 is a block diagram of a general information handling system according to an embodiment of the present disclosure.

FIG. 7 shows a generalized embodiment of an information handling system 700 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732 and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 4394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712 or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700.

Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A mounting rail for an input/output module of an information handling system, the mounting rail comprising:
   a main portion including first, second, third, and fourth surfaces, wherein the first surface and the second surface intersect at a first edge of the first surface;
   a first railing extending from the first edge of the first surface;
   a second railing extending from a second edge of the first surface, wherein the first surface and the third surface intersect at the second edge of the first surface;
   a non-threaded channel extending from the second surface through the main portion to the third surface;
   a threaded engagement secured above the second surface of the main portion, wherein the threaded engagement is aligned with the non-threaded channel, wherein an outer surface of the threaded engagement is located along a third edge at the intersection between the second surface and the fourth surface, the third edge being distal from the first edge; and
   a printed circuit board slides within a channel that is formed by the first railing, the second railing, and the first surface of the main portion.

2. The mounting rail of claim 1, wherein the threaded engagement includes:
   an outer edge; and
   a threaded insert within the outer edge, wherein the threaded insert is configured to interface with a screw to hold the mounting rail in physical communication with the information handling system.

3. The mounting rail of claim 2, wherein the threaded insert includes a thickened wall with threads.

4. The mounting rail of claim 2, wherein the outer edge is substantially circular in shape and has a thickness from the outer surface of the threaded engagement to an outer surface of the threaded insert.

5. The mounting rail of claim 4, wherein a width of the main portion is substantially equal to the thickness of the outer edge and a diameter of the non-threaded channel.

6. The mounting rail of claim 1, wherein a portion of the threaded engagement is located above the first railing.

7. An information handling system comprising:
   an input/output module;
   a power supply unit to provide power to components of the information handling system including the input/output module; and
   a mounting rail to guide the input/output module within the information handling system, the mounting rail including:
   a main portion including first, second, third, and fourth surfaces, wherein the first surface and the second surface intersect at a first edge of the first surface;
   a first railing extending from the first edge of the first surface;
   a second railing extending from a second edge of the first surface, wherein the first surface and the third surface intersect at the second edge of the first surface;
   a non-threaded channel extending from the second surface through the main portion to the third surface;
   a threaded engagement secured above the second surface of the main portion, wherein the threaded engagement is aligned with the non-threaded channel, wherein an outer surface of the threaded engagement is located along a third edge at the intersection between the second surface and the fourth surface, the third edge being distal from the first edge; and
   a printed circuit board slides within a channel that is formed by the first railing, the second railing, and the first surface of the main portion.

8. The information handling system of claim 7, wherein the input/output module includes a printed circuit board, wherein the printed circuit board slides within the channel of the mounting rail while the input/output module is inserted within the information handling system.

9. The information handling system of claim 7, wherein the threaded engagement includes:
   an outer edge; and
   a threaded insert within the outer edge, wherein the threaded insert is configured to interface with a screw to hold the mounting rail in physical communication with the information handling system.

10. The information handling system of claim 9, wherein the threaded insert includes a thickened wall with threads.

11. The information handling system of claim 9, wherein the outer edge is substantially circular in shape and has a thickness from the outer surface of the threaded engagement to an outer surface of the threaded insert.

12. The information handling system of claim 11, wherein a width of the main portion is substantially equal to the thickness of the outer edge and a diameter of the non-threaded channel.

13. The information handling system of claim 7, wherein a portion of the threaded engagement is located above the first railing.

14. An information handling system comprising:
   a connector plane including first and second connectors;
   an input/output module including a printed circuit board to interface with the first connector;
   a power supply unit to interface with the second connector and to provide power to components of the information handling system including the input/output module;
   a tempan in physical communication with the connector plane;
   a mounting rail in physical communication with the tempan, the mounting rail to guide the input/output module within the information handling system, the mounting rail including:
      a main portion including first, second, third, and fourth surfaces, wherein the first surface and the second surface intersect at a first edge of the first surface;
      a first railing extending from the first edge of the first surface;
      a second railing extending from a second edge of the first surface, wherein the first surface and the third surface intersect at the second edge of the first surface;
      a non-threaded channel extending from the second surface through the main portion to the third surface;
      a threaded engagement secured above the second surface of the main portion, wherein the threaded engagement is aligned with the non-threaded channel, wherein an outer surface of the threaded engagement is located along a third edge at the intersection between the second surface and the fourth surface, the third edge being distal from the first edge; and
      a printed circuit board slides within a channel that is formed by the first railing, the second railing, and the first surface of the main portion; and
   a screw to secure the mounting rail to the tempan, wherein the screw slides through the non-threaded channel and interfaces with the threaded engagement.

15. The information handling system of claim 14, wherein the printed circuit board slides within the channel of the mounting rail while the input/output module is inserted within the information handling system.

16. The information handling system of claim 14, wherein the threaded engagement includes:
   an outer edge; and
   a threaded insert within the outer edge, wherein the threaded insert is configured to interface with a screw to hold the mounting rail in physical communication with the information handling system.

17. The information handling system of claim 16, wherein the threaded insert includes a thickened wall with threads.

* * * * *